United States Patent
Linjama et al.

(10) Patent No.: US 8,131,321 B2
(45) Date of Patent: Mar. 6, 2012

(54) VIBRATION MOTOR AS A TRANSDUCER OF AUDIO

(75) Inventors: Jukka Linjama, Espoo (FI); Topi Kaaresoja, Tuusula (FI)

(73) Assignee: Nokia Corporation, Espoo (FI)

(*) Notice: Subject to any disclaimer, the term of this patent is extended or adjusted under 35 U.S.C. 154(b) by 984 days.

(21) Appl. No.: 12/084,075

(22) PCT Filed: Oct. 27, 2005

(86) PCT No.: PCT/IB2005/003209
§ 371 (c)(1),
(2), (4) Date: Apr. 24, 2008

(87) PCT Pub. No.: WO2007/049091
PCT Pub. Date: May 3, 2007

(65) Prior Publication Data
US 2009/0156266 A1  Jun. 18, 2009

(51) Int. Cl.
*H04B 1/38* (2006.01)
(52) U.S. Cl. .............. 455/567; 455/550.1; 455/90.1; 455/569.1
(58) Field of Classification Search .......... 455/567, 455/550.1, 90.1, 90.2, 569.1, 556.1, 552.1, 455/74, 74.1, 79; 340/407.1, 7.6, 388.1, 340/388.4
See application file for complete search history.

(56) References Cited

U.S. PATENT DOCUMENTS

| | | | |
|---|---|---|---|
| 6,259,935 B1 * | 7/2001 | Saiki et al. | 455/567 |
| 6,809,635 B1 * | 10/2004 | Kaaresoja | 340/407.1 |
| 2003/0042868 A1 * | 3/2003 | Muramatsu | 320/107 |

FOREIGN PATENT DOCUMENTS

| | | |
|---|---|---|
| EP | 0 888 032 A1 | 12/1998 |
| JP | 5-212354 | 8/1993 |
| JP | 8-139891 | 4/2003 |

* cited by examiner

*Primary Examiner* — John J Lee
(74) *Attorney, Agent, or Firm* — Harrington & Smith (57) ABSTRACT

A portable electronic device, such as a pager or a mobile station, has a housing and a vibration motor coupled to the housing for imparting vibration to it. Within the device, an electronic audio signal is preferably split into high and low frequency components by parallel filters. Pulses of the low frequency component are rectified, voltages of those rectified pulses are quantified and at least some are converted to pulse widths, and the train of pulse widths is amplified to drive the vibration motor, resonating the housing at in correspondence with the pulse amplitudes of at least some pulses of the original electronic audio signal. Various adaptive schemes are presented to control the number of modulated pulses that drive the vibration motor to enhance the user experience. The vibration motor may act as an audible sub-woofer and/or may provide a bass effect vibration within or beyond the audible range in correspondence to certain spaced pulses of the original audio signal.

21 Claims, 9 Drawing Sheets

VIBRATION MOTOR AS A TRANSDUCER OF AUDIO

FIELD OF THE INVENTION

This disclosure relates to portable devices such as mobile radio terminals and pagers that have a vibration function for silently alerting a user to an incoming communication. It is particularly directed to a method and apparatus for driving a vibration mechanism with electronic audio signals to generate a vibration in correspondence with that audio signal.

BACKGROUND

Portable electronic communication devices continue to integrate multiple functions beyond their core communications with great popularity, including for example still and/or video cameras, music storage and playing, GPS circuitry, and Internet operability. These desires of customers for multiple functionality lies in opposition to their desire for small size in the same communication device, so manufacturers increasingly seek to make components multi-functional and increase functionality via software to serve these competing customer desires while containing costs and size. One feature of enduring customer popularity is both an audible and a silent alert for incoming communications, common on devices such as mobile stations and pagers and selectable by a user. The silent alert is selected, for example, when the user desires to be made aware of an incoming call or page without interrupting all nearby participants in a meeting or social engagement. With few recent exceptions, the vibration mechanism has been dedicated solely to the silent alert function.

The vibration mechanism typically includes a (relatively) massive rotor mounted to a shaft that is driven by an electric motor activated by an incoming communication when the user selects the silent mode. The rotor is purposefully not rotationally balanced about the shaft, so rotation of the shaft causes a noticeable vibration. The eccentricity of the rotor's mass about the shaft is selected to be substantial enough to cause the entire mobile station or pager to vibrate, gaining the attention of a user holding the device in his/her hand or pocket. Typically, the electric "vibration" motor is mounted directly to the housing of the device.

Relevant teachings, by which the vibration mechanism may be used for the synthesis of low-frequency sound in addition to its traditional function of silent vibration alerts, is described in U.S. Pat. No. 6,809,635, issued on Oct. 26, 2004 and entitled "Mobile Terminal Using a Vibration Motor as a Loudspeaker and Method of Use Thereof", which is hereby incorporated by reference. That incorporated patent also refers to U.S. Pat. Nos. 5,300,851; 5,373,207; 6,081,055; 5,783,899; 5,861,797 and 5,960,367, as well as European Patent Applications EP 0 688 125 A1; 1 001 249 A2 and 1 035 633 A1 as describing vibration motors and their implementations. These teachings are directed to increasing the functionality of such a vibration mechanism.

SUMMARY

These teachings are directed to enhancing a user's sensory experience, such as when playing music. The invention may be implemented in devices such as mobile radio terminals that traditionally use a vibration mechanism for non-audio purposes, or in a portable music device such as an MP-3 player or broadcast radio receiver that traditionally does not employ a vibration mechanism. Alternatively, devices such as the above mobile radio terminals and portable music devices may serve as a source music device that provides the audio signal. In such alternative embodiments, devices of the present invention are coupled via a conductive wire or wireless (e.g., Bluetooth) connection to the otherwise independent source music device and function similarly as if they were physically integrated into the source device. Embodiments may provide an audible sub-woofer sound to the user, and/or a bass effect ('kick') that may or may not be within the audible frequency range that corresponds to certain notes sounded over a traditional speaker.

Embodiments of the invention may be a method of transducing an audio signal in a portable electronic device. Transducing is used herein in its broad sense, converting an input signal of one form into an output signal of a different form. For example, different embodiments of the invention may convert an input electronic signal into an output vibration that may or may not be within normal human hearing frequencies. In the method, a series of driving pulses are generated by pulse-width modulating an electronic audio signal. A vibration motor is then driven with at least some of the series of driving pulses to transduce the electronic audio signal into a vibration, which may be heard by the user or merely felt if below the threshold for human hearing. The vibration motor is specifically configured to vibrate a housing of the portable electronic device. In one variation, generating the series of driving pulses includes, for each of the series of driving pulses, rectifying a sample of the electronic audio signal, determining an amplitude of the rectified sample, and then mapping the amplitude to a pulse width.

Another embodiment of the invention is a portable electronic device, such as a pager or a mobile station. The device includes a housing and a vibration motor coupled to the housing for imparting vibration to the housing. Also included is a source for providing an electronic signal, such as an antenna for receiving a streaming audio signal or voice communications over a wireless link (e.g., Bluetooth or streaming download/podcasts) or a wired connection to a digital music player/mobile terminal, or a computer readable memory for storing an electronic file such as digital music or combined audio-visual files. A mapper is also in the device for converting a pulse amplitude to a corresponding pulse width. An amplifier is disposed between the mapper and the vibration motor for amplifying a signal from the mapper and further for driving the vibration motor with the amplified signal. In response the vibration motor produces a vibration.

Another embodiment of the invention is a mobile station that includes means for providing an electronic audio signal, such as a stored media file or an antenna and receiver for receiving a media file or voice communications in real time. The mobile station further has means for modulating at least some pulse amplitudes of the electronic audio signal to corresponding pulse widths, and means such as an amplifier for driving a motor means with the corresponding pulse widths. The motor means may be a vibration motor with an imbalanced rotor. The vibration from the motor means may be within the audible range of human hearing, or it may be experienced by the user only as a touch input if beyond that frequency range.

These and other aspects are set forth with particularity below.

DETAILED DESCRIPTION

The invention is not limited to the following described embodiments, which provide readily adaptable implementations. One skilled in the art will see enhancements that keep within the scope described by the embodiments, and other devices in which the present invention may be disposed. As background, the teachings of U.S. Pat. No. 6,809,635 are briefly reviewed.

U.S. Pat. No. 6,809,635 describes a mobile station that uses a conventional vibration motor to perform the additional function of reproducing audio communications received by the user of the mobile terminal. The use of the vibration motor either eliminates altogether the requirement for a separate loudspeaker or enhances the reproduction of lower frequency components of the received audio communications which permits the loudspeaker to function as a tweeter to reproduce only the higher frequency components of the received audio communications to produce an overall better reproduction of the received audio communication.

Figure 1A:
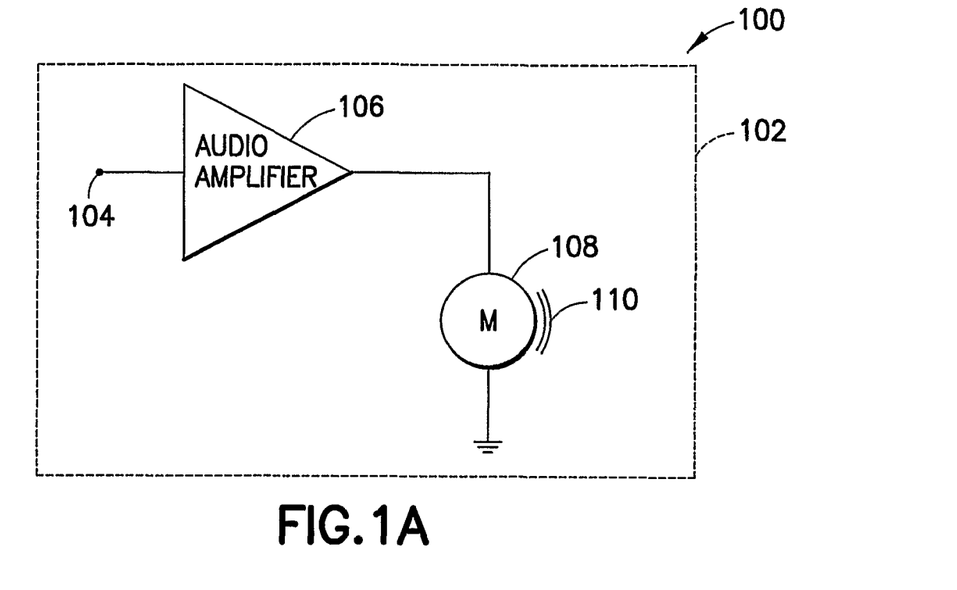
FIGS. 1A-1D are each schematic diagrams reproducing FIGS. 3-6 respectively of U.S. Pat. No. 6,809,635.

In one embodiment reproduced here as FIG. 1A, U.S. Pat. No. 6,809,635 describes applying a demodulated output signal 104, in the form of audio communications, to an input of an audio amplifier 106 that amplifies the input audio communications to a sufficient signal level to drive the vibration motor 108 to reproduce an audible sound 110. The gain level is chosen to provide the required output sound level, and the audio amplifier 106 may utilize amplification, which need not be a linear function of frequency so as to better reproduce the natural sound of the caller.

Figure 1B:
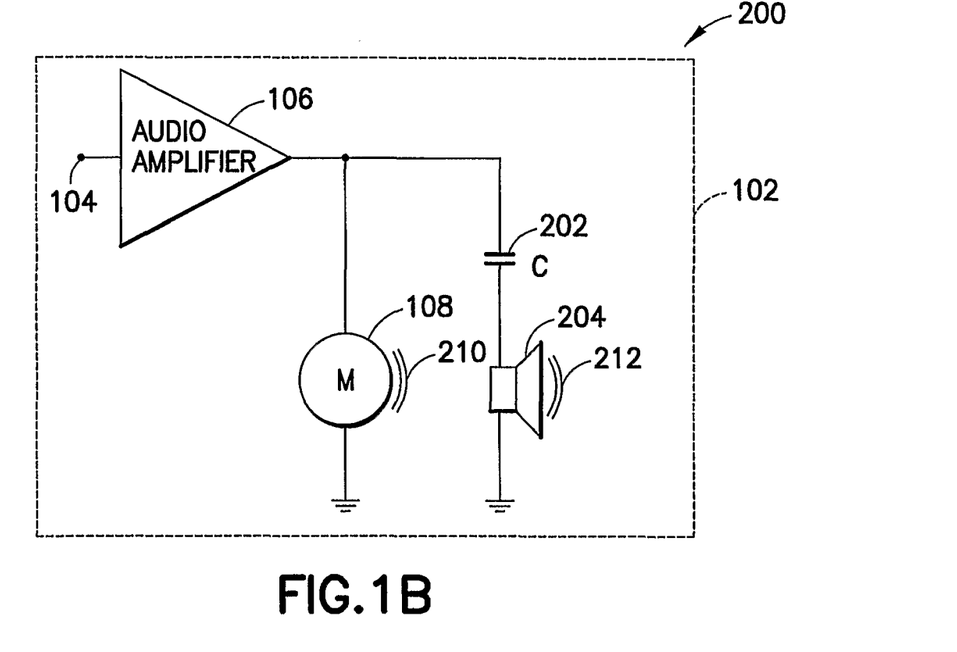

In another embodiment reproduced here as FIG. 1B, U.S. Pat. No. 6,809,635 describes disposing a capacitor 202 between the audio amplifier 106 and a speaker 204. In this embodiment, the amplifier 106 drives both the speaker 204 and the vibration motor 108, but the capacitor 202 acts as a high pass filter, substantially attenuating the lower frequencies so the speaker 204 acts as a tweeter that reproduces 212 only the higher frequency components of the audio signal 104, leaving only the vibration motor 108 to reproduce 210 the lower frequency components. A third embodiment reproduced here as FIG. 1C uses a cross-over network (passive or active) to selectively split the signal output from the audio amplifier 106 into two frequency-distinguished channels 304, 306. The lower-frequency channel 304 feeds an input of the vibration motor 108, and the higher-frequency channel 306 feeds an input of the speaker 204.

A fourth embodiment of U.S. Pat. No. 6,809,635, reproduced here as FIG. 1D, describes splitting the input signal among two branches, the signal on each branch then being frequency distinguished by high and low pass filters 310, 308 respectively. The output of these filters 310, 308 is then separately amplified by amplifiers 314, 312 of comparatively different gains. One amplifier 314 drives the speaker 204 and the other amplifier 308 drives the vibration motor 108. The different gains reflect the difference in efficiency between the speaker/tweeter 204 and the vibration motor 108. In each of the above embodiments of U.S. Pat. No. 6,809,635, the vibration motor 108 may be driven separately in its traditional silent-alert mode by a signal indicative of an incoming page/phone call rather than by an audio signal 104.

Figure 1C:
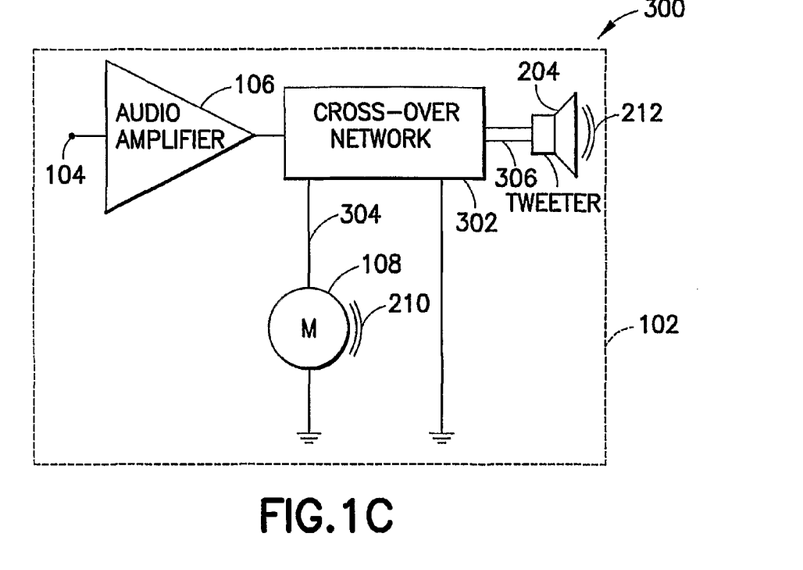
Figure 1D:
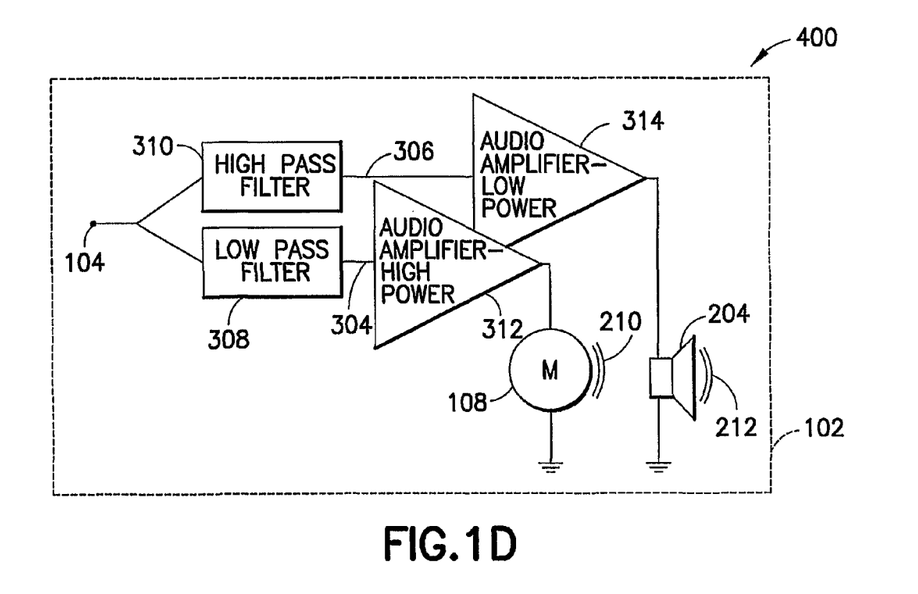
Figure 2:
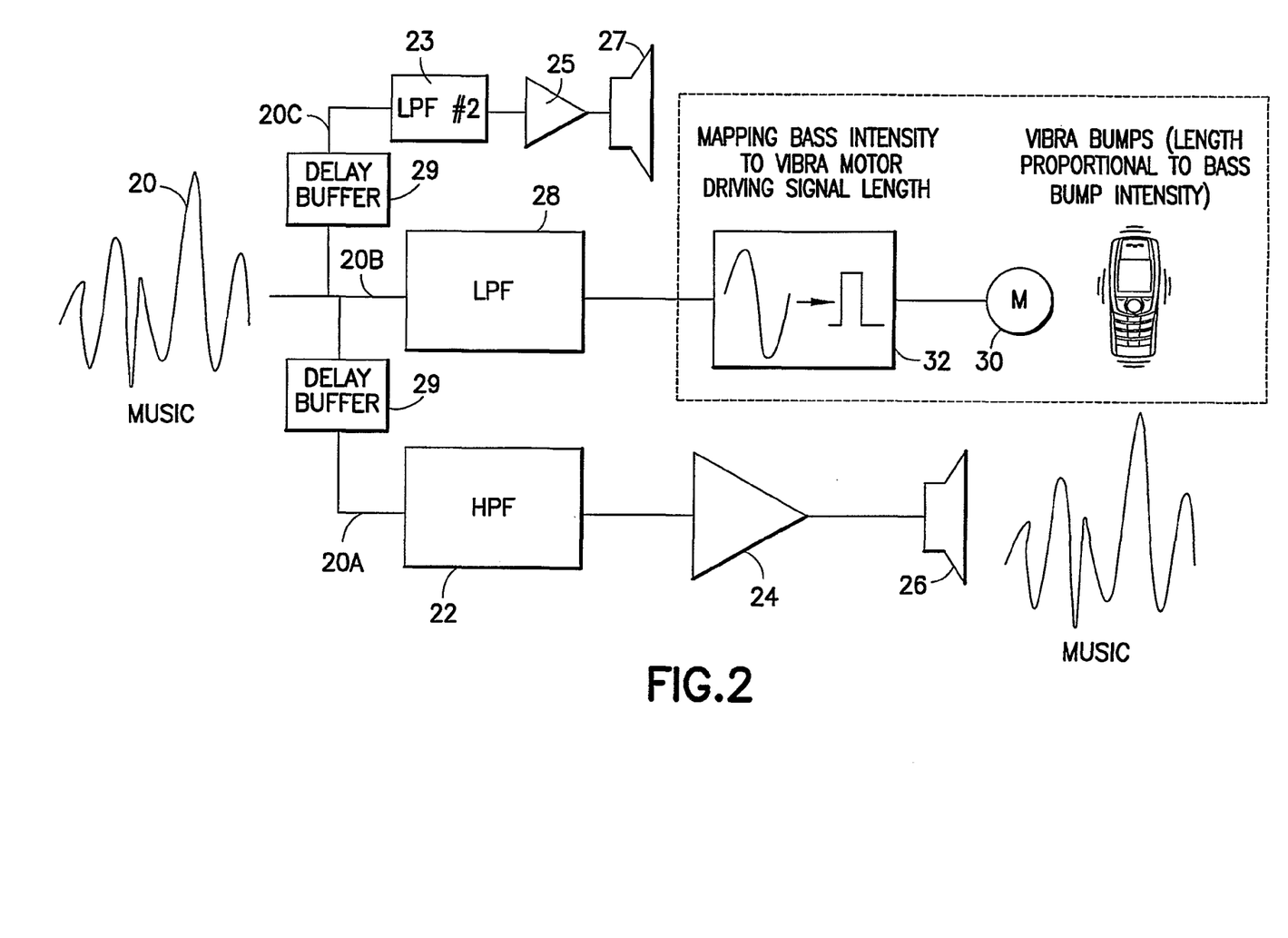
FIG. 2 is a schematic block diagram showing music synthesized in both high and low frequency bands, the low band according to an embodiment of the present invention.

Now embodiments of this invention are described, wherein the audio signal is mapped to a driving signal for the vibration mechanism. Preferably only the filtered low frequency components thereof are mapped, the high frequency components being filtered previous to the mapping, such as by the low pass filter 308 (FIG. 1D) of the cross-over network (FIG. 1C). An embodiment adapting FIG. 1D is shown in FIG. 2. In FIG. 2, an audio signal 20 is split into two parallel paths 20A, 20B. The audio signal may derive from a locally stored digital music file, a demodulated voice signal or Internet-based streaming audio (e.g., a webcast or a "podcast") received over a wireless link, or any of a variety of other audio signal sources wired or wireless. Preferably, only musical audio signals are mapped as described herein, where the device recognizes signals as musical audio signals by, for example, the compression format of those signals.

Consider the audio signal 20 to be composed of both high and low frequency components, wherein frequency refers to frequency as transduced by a conventional speaker into an audible form between about 15-20,000 Hz, the normal range of human hearing for a young adult. Low frequency components may be those ranging up to about 2,000 Hz, 5,000 Hz, or 10,000 Hz, though any cutoff between low and high frequency components may be chosen based on specific response of hardware (e.g., the vibration mechanism) chosen for a particular embodiment. The high frequency components are then the remaining higher frequencies of the overall audible band. Of course, a mid-range speaker (not shown) may be used for fuller sound quality by transducing only those frequencies between the higher frequency components and the lower frequency components. For simplicity, the following description assumes no mid-range speaker. Processing of the signal 20 along the first path 20A that transduces the high frequency components is as previously described: a high pass filter 22 attenuates low frequency components and allows only high frequency components to pass, a first amplifier 24 amplifies with a first gain and drives a tweeter 26 with its output. The first gain is matched to the audio response of the tweeter 26 as is well known in the acoustic arts. Generally, the first gain is relatively small as the actual transducing components (e.g., the former and cone) of the tweeter 26 are not massive and their vibration requires little power.

Processing of the signal 20 along the second path 20B that transduces the low frequency components is now described. The second path 20B is of course parallel to the first 20A, as both high and low components of the input signal 20 are re-combined in air once transduced. A low pass filter 28 attenuates high frequency components and allows only low frequency components to pass. A vibration mechanism, such as the electric vibration motor 30 previously described, is coupled to the output of the low pass filter 28 through a signal-converter block 32. The signal-converter block 32 converts intensity of the low frequency component signal that is input into the block 32 into a driving signal length for the vibration motor 30 that is output from the block 32.

In some embodiments, the vibration motor may vibrate within the range of human hearing to act as a low frequency speaker or sub-woofer. In other embodiments, the motor does not vibrate in place of a woofer/sub-woofer but in conjunction with it to provide a bass effect or 'kick' stimulus. For example, the HPF 22 may removed so that the speaker 26 outputs both high and low human hearing frequencies, or another low-pass filtered output of the signal 20 may feed a traditional low-frequency speaker 27 through another amplifier 25 in addition to those components shown in FIG. 2. As shown in FIG. 2, a third parallel signal path 20C passes the signal 20 through a separate low-pass filter whose pass frequency may differ from the first LPF 28 given the differences between speaker 27 and vibration motor 30. Alternatively, the output of a single low pass filter 28 may feed both the low frequency speaker 27 and the vibration motor 30, with the mapper 32 clipping the signal that it outputs to the vibration motor 30 so that it provides a 'kick' stimulus simultaneous with low frequency tones output from the low frequency speaker 27. The kick stimulus is felt by a user through the touch sensation as vibrations of the device body, not necessarily as audible tones.

Figure 3:
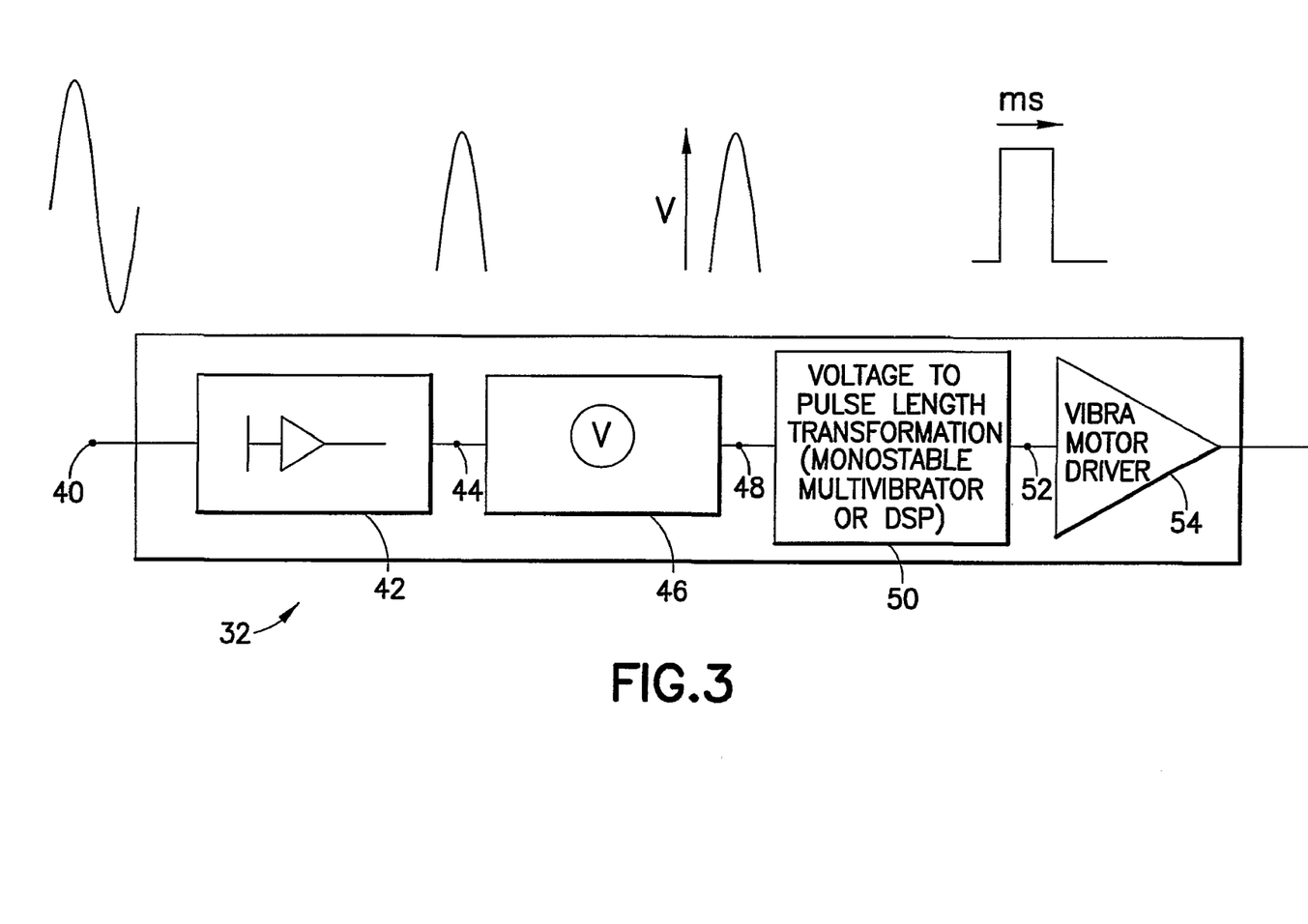
FIG. 3 is a schematic block diagram showing further detail of the low-frequency band of FIG. 2.

FIG. 3 shows a further detail of an embodiment of the signal-converter block 32, with representations of the signal present above the signal converter block 32 at various nodes between components of the block 32. The low frequency component signal present at input node 40 has a sinusoidal waveform as illustrated above the input node 40. A rectifier diode 42, forward biased to allow current only from left to right as illustrated in FIG. 3, rectifies that sinusoidal waveform to produce at a first intermediate node 44 a rectified waveform as illustrated above that first intermediate node 44. There are various forms a rectified waveform can take; that illustrated is merely a common one. A voltage block 46 then quantifies an intensity (voltage) of the rectified signal, which is output on a second intermediate node 48. A mapper 50, which may be for example a monostable multivibrator, a general purpose processor, or a digital signal processor, converts the signal intensity from the second intermediate node 48 to a pulse length, which is output to a third intermediate node 52 and illustrated above that third intermediate node 52 as a square pulse with a determinate length in milliseconds. A driver 54 then amplifies the signal on the third intermediate node 52 to drive the vibration motor 30 (FIG. 2) with, a pulse length representative of the low frequency component (at node 40) of the original audible signal 20 (FIG. 2). The driver 54 may be a part of the signal-converter block 32 or separate from it, but is preferably between the mapper 50 and the vibration motor 30.

Other implementations are also viable to embody the inventive concept. For example, rather than a rectifier diode and voltage block, the entire input signal at the input node 40 may be processed in a digital signal processor by a series of transistors to convert input signal amplitude (which may be determined in any number of manners, RMS, squared, etc.) to a pulse length used to set a driving frequency of the vibration motor 30. Various different embodiments and implementations will be recognizable to those skilled in the art; the embodiment of FIG. 3 is seen as advantageous for implementation in a mobile station due to its minimal use of processing power, relatively small size, and cost effectiveness. The various embodiments such as that of FIG. 3 may also be imposed between the cross-over network and the vibration motor 108 of FIG. 1C, or between a low-pass filter and the vibration motor of FIG. 1B.

The above description generally contemplates direct mapping, where each pulse of the input signal 20 that passes a low pass filter 28 is realized as an excitation of the vibration motor 30. In some instances, this may result in excitation pulses to the motor that are too frequent, leaving a bass sound that is nearly continuous. In some instances, this will give a sub-woofer sound that is irritating, or at least which is not perceived by a user as enhancing the listening experience. Where end users experience an irritating sub-woofer for certain music, they may tend not to prefer the feature of a vibration motor 30 as sub-woofer at all. To this problem, embodiments of the present invention employ the concept of adaptive pulse control.

Adaptive pulse control uses appropriate dynamic control of the filtered low frequency sound, in order to adapt the amount of vibration to be at a minimum but still perceivable in a wider range of music content, either as humanly audible or vibrations to be felt. In this arrangement, compression (limiter) and automatic gain control (AGC) algorithms are used. These enable an implementation, where basically short pulses of vibration are output and spaced from one another, instead of more continuous vibrations following the low frequency notes in some music. These are illustrated in FIGS. 4A through 6.

Figure 4A:
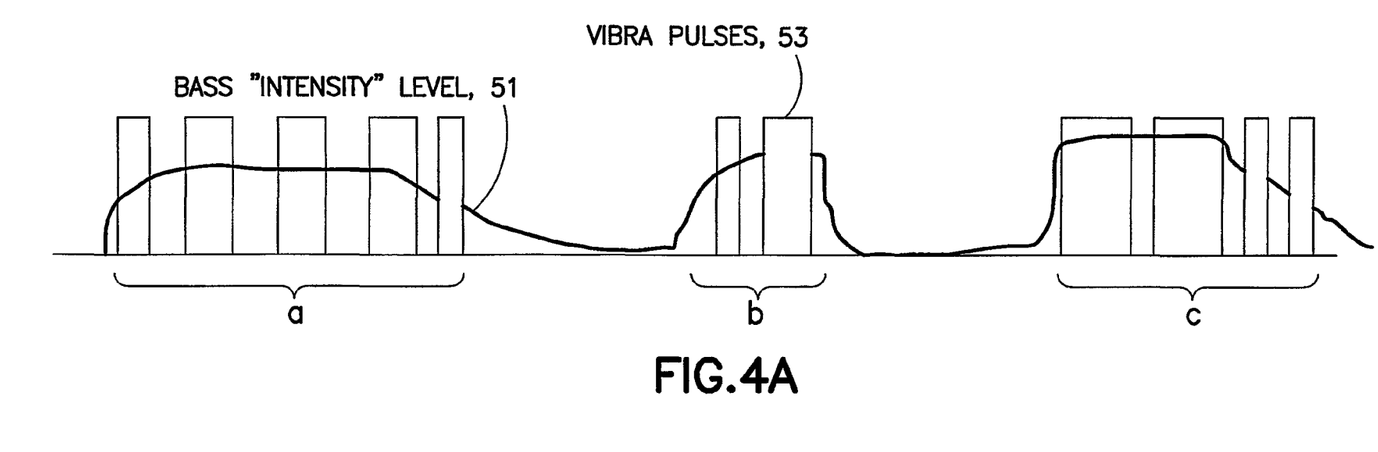
FIGS. 4A-B are pulse diagrams showing adaptive control in converting audio signal pulses into excitation signals to a vibration motor.
Figure 4B:
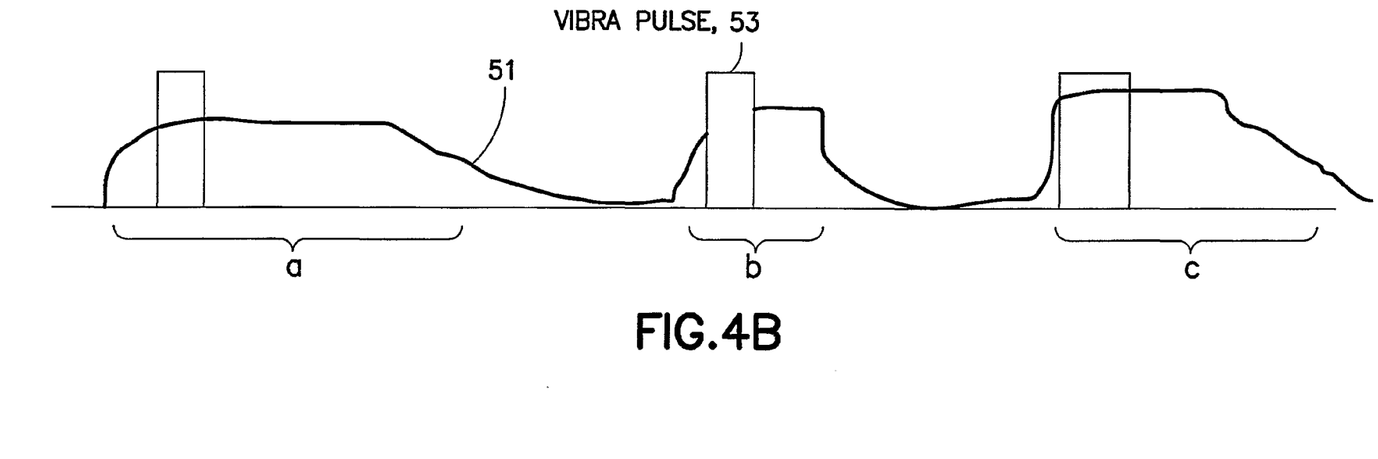

FIG. 4A illustrates a graph of low frequency signal intensity over time. The solid bass-intensity line 51 represents an analog version of the lower frequency portions of the input audio signal 20. Consider this an analog version of a signal output from the low pass filter 28 that is input into the signal converter block 32. The vibration pulses 53 result from pulse-width mapping the intensity of the bass-intensity line 51 in the signal converter block 32. Direct mapping is shown in FIG. 4A, where each pulse-width modulated pulse mapped from the input signal (represented as line 51) is an excitation pulse to the vibration motor 30. Direct mapping a first bass movement a yields six excitation pulses 53 that are output to the vibration motor 30. Similarly, a second bass movement b yields two excitation pulses 53 to the vibration motor 30, and a third bass movement c yields four excitation pulses 53. As illustrated in FIG. 4A, each set of pulses 53 associated with a single bass movement are closely spaced in time. Since the pulse length derives from the bass intensity, these excitation pulses can 53 blend together when experienced by a user, especially considering the mechanical/inertial constraints of the physical vibration motor and its unbalanced rotor. FIG. 4B illustrates an adaptive pulse control solution, where each bass movement a, b, c, results in only a single pulse 53 output to the vibration motor 30. This may be considered a 'kick' effect, wherein each bass movement begins with a sub-woofer imitating pulse to the vibration motor 30. Using the 'kick' effect, the adaptive pulse control may be used in addition to a traditional woofer or other speaker, rather than in place of a woofer/low-frequency response speaker.

Figure 5A:
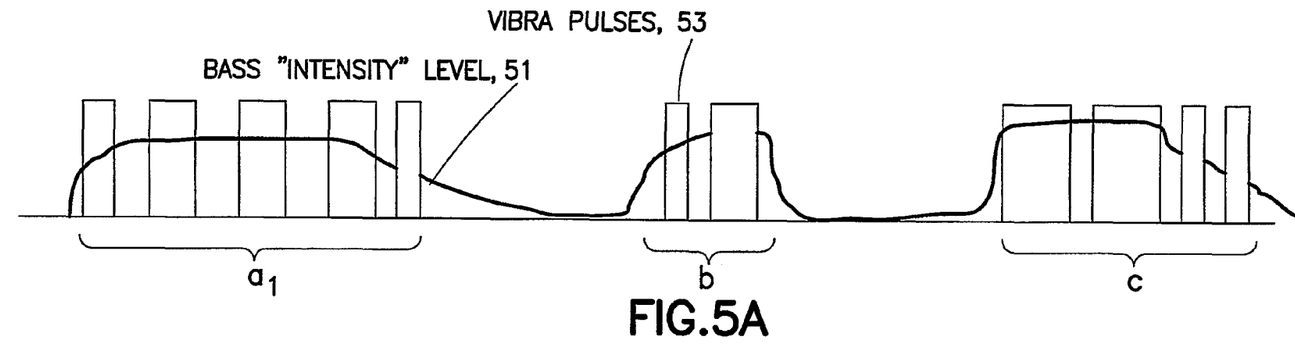
FIG. 5A-B are similar to FIGS. 4A-B showing thresholds used to drive adaptive control.
Figure 5B:
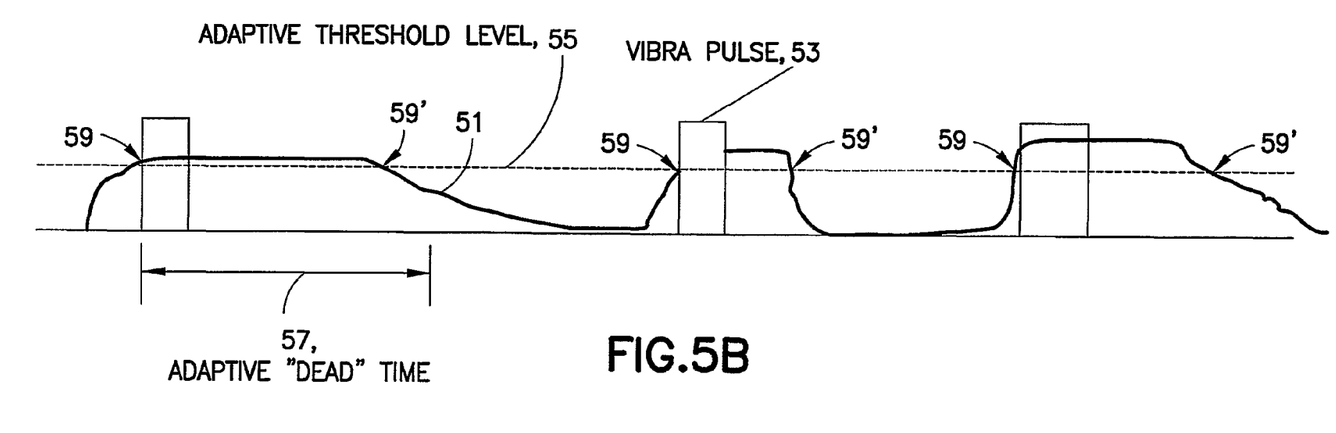

FIG. 5A-B illustrate one implementation to achieve the result of FIG. 4B. FIG. 5A is identical to FIG. 4A, and FIG. 5B is identical to FIG. 4B except for the addition of an adaptive threshold 55 and an adaptive time delay 57 in FIG. 5B. The adaptive threshold 55 is a threshold intensity at which the signal converter block 32 is allowed to provide an output that drives the vibration motor 30. Any input signal with intensity below that threshold 55 yields no excitation pulse 53 to the vibration motor 30. Whether the pulses corresponding to signal intensity below the threshold 55 are generated at the signal converter block 32 and inhibited from driving the motor 30, or not generated in the signal converter block 32 at all, are variances in implementation. Upon the bass intensity line 51 positively crossing the threshold level 55, shown in FIG. 5B by reference numbers 59, the signal converter block 32 becomes active and maps the input signal to an output pulse 53 (or any inhibiting of generated pulses is suspended in an alternate implementation).

In one embodiment, an adaptive time delay 57 is imposed from the start of the output pulse 53, or from the instant 59 at which the bass intensity positively crossed the adaptive threshold 55. During that adaptive time delay 57, the signal converter block 52 is prevented from providing an output excitation signal to the vibration motor 30, resulting in a 'dead time' for which the actual bass intensity line 51 is irrelevant to stimulation of the vibration motor 30, by inhibiting generation of additional pulses or blocking all pulses except the first pulse during that 'dead time'. The inventors have concluded that a span of about 100-200 milliseconds is an appropriate adaptive time delay 57 for enhancing the user sub-woofer/vibration experience, though other time periods may be used in keeping with this invention.

In another embodiment, the signal converter block 32 is prevented from providing an output (or the output is blocked from the vibration motor 30) until after the bass intensity line 55 crosses the threshold 55 in the negative direction, shown as reference numbers 59' in FIG. 5B. Of course, the first excitation pulse 53 sent after the bass intensity line 51 first crossed the threshold 55 in the positive direction is not inhibited from being sent to the motor 30. In order to avoid short-spaced excitation pulses 53 when the bass intensity line 51 varies frequently across the threshold 55, one threshold may be used for the positive crossing 59 to generate one pulse and a different, preferably lower threshold may be used for the negative crossing 59' to enable the signal converter block 32 to again provide an output to the motor 30. Only one threshold 55 is needed for the adaptive time delay 57 embodiment.

Figure 6A:
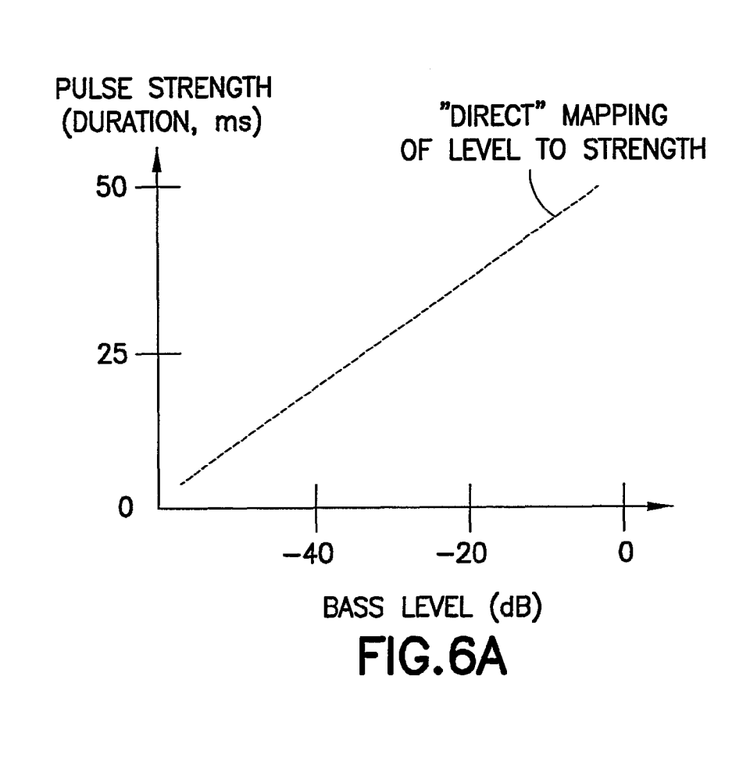
FIGS. 6A-B are graphs with bass level (dB) versus pulse strength for direct mapping and adaptive mapping, respectively.
Figure 6B:
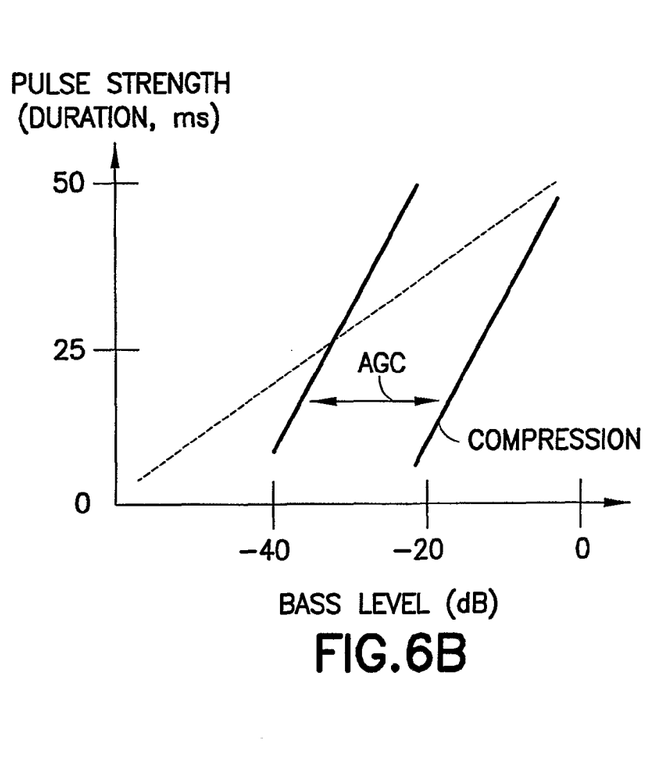

FIGS. 6A-B illustrate the advantages of adaptive pulse control as compared to the direct mapping. In the direct mapping shown in FIG. 6A, lower intensity of bass notes yield minimal pulse strength/duration, which the user experiences as minimal or no vibration at all from the vibration motor 30. Conversely, at high bass note intensity, direct mapping yields very intense pulse strengths (very long pulses), which to a user can overwhelm other sounds of the audio signal 20 produced by conventional speakers 26, or be experienced as continuous vibration without clear relation to the underlying music. With adaptive pulse mapping as illustrated in FIG. 6B, the vibration pulse intensity (duration) is limited by the gain control and signal compression that are typically already applied to the signal 20. As was discussed above, gain control applied to different speakers (e.g., tweeter and woofer) varies based on the signal, as well known in the art. Also known in the art is to vary compression of the signal 20 based on the frequency response, yielding a compression curve. This is inherent in the compression format used to digitize the musical audio signal, and common compression formats for music include MP3 and AAC. The portable device already uses gain control and compression in order to process the audio signal. Gain applied to a portion of the signal rises with signal intensity in order to drive the traditional speaker properly. That same gain control curve, and the corresponding compression curve, are used to adaptively control the vibration pulse output from a bass signal input. Both those curves depend in part from signal intensity, especially AGC. In FIG. 6B, the slope of the adaptive curve (in solid lines) results from adapting to signal compression, while the position of the solid line curve varies along the horizontal axis based on gain control.

Figure 7:
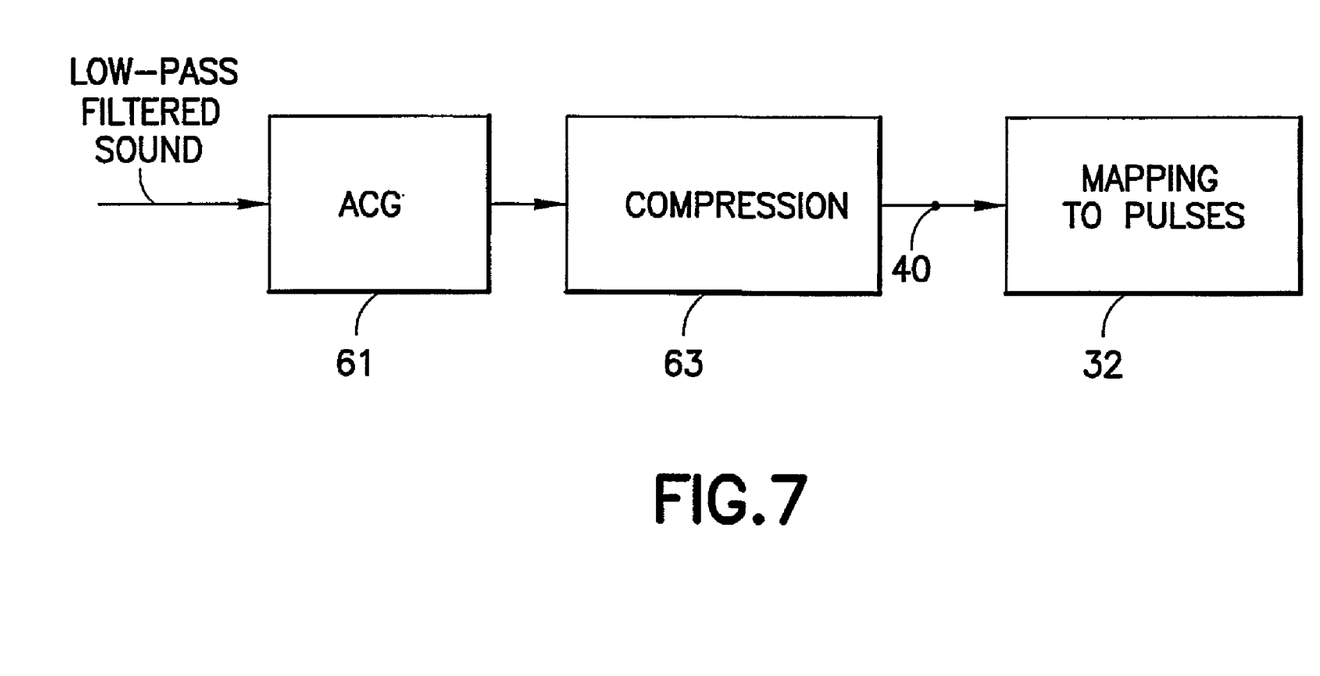
FIG. 7 is a simplified block diagram showing automatic gain control and compression configured to adaptively map pulses to a vibration motor.

Implementation of FIG. 6B is shown in simplified block diagram form at FIG. 7, which is imposed between the low pass filter 28 and the signal converter block 32 of FIG. 2. The output from the low pass filter 28 (FIG. 2) is input into an automatic gain control AGC block 61 which applies an AGC algorithm. Many such algorithms are known in the digital audio signal processing arts for driving a speaker. A compression block 63 then applies a compression algorithm to the signal, shifting the slope of the intensity/pulse length curve from the dotted line (direct mapping) to the solid line (adaptive mapping) as shown in FIG. 5B. The output of the compression block 63 then becomes the input at node 40 of FIG. 3 for the previously described signal converter block 32.

For implementation within a mobile station, the voltage of the vibration pulse may be pulse-width modulated PWM at 100% for optimum fidelity where the vibration motor is used as an audible subwoofer, though in some embodiments this may be changed to some value greater than or less than 100% so that the pulse width (node 52) is proportionally scaled to voltage amplitude (node 48). It is also preferable that the pulse length (node 52) is constrained to be less than about 50 milliseconds. The inventors have determined that pulse lengths above about 50 milliseconds tend to exceed the nominal RPM, and the subwoofer starts to feel too intense, leading to an uncomfortable user experience. In addition, if played longer than about 50 milliseconds, the experience to the user is no longer a 'kick' but more or less a continuous stimulation leading to an uncomfortable user experience. In general, the ideal operating range for embodiments of the present invention, when used strictly as an audio device rather than providing a sensory 'kick' accompanying traditional speaker output, is seen to be between about 70 Hz and about 200 Hz. Commonly available vibration motors 30 tend not to be sufficiently responsive to reproduce sound below 70 Hz, and above 200 Hz the result is seen as overstimulating and uncomfortable. Note that pulse width modulation, pulse duration modulation, and pulse length modulation refer to the same general concept of modulating an output pulse to an instantaneous sample of an input wave by varying a leading, trailing, or both edges of that pulse to achieve a particular spacing between those edges.

Given the mass of certain vibration motor embodiments, some implementations may need to actively synchronize outputs from the speaker(s) 26, 27 and the vibration motor 30. While each may receive their input simultaneously or nearly so, the signal response of the speaker 26, 27 far exceeds that of more massive vibration motors 30. One embodiment to ensure that the output, rather than just the input, of both transducers are synchronized is to impose a delay buffer 29 along the first path 20A and third path 20C of FIG. 2. The delay buffer 29 delays the signal feed to the speakers by a fixed time interval that corresponds to the response differential between the speakers 26, 27 and the vibration motor 30. As the response times of a traditional woofer 27 and tweeter 26 typically vary only a negligible amount, especially in portable devices of the handheld size that include two speakers 26, 27, a single delay buffer 29 may be used from which the first 20A and third 20C signal paths diverge. In this variation, the second signal path 20C that feeds the vibration motor 30 branches from the source 20 prior to the delay buffer 29.

A method according to an exemplary embodiment is then rectifying an audio signal or at least its low frequency component, measuring intensity of the rectified signal, mapping that intensity to a pulse length, and driving a vibration mechanism with the pulse length. Preferably, the high frequency components of the audio signal are filtered out prior to rectifying, though they may be filtered between rectifying and measuring intensity with some minimal loss of efficiency.

Figure 8:
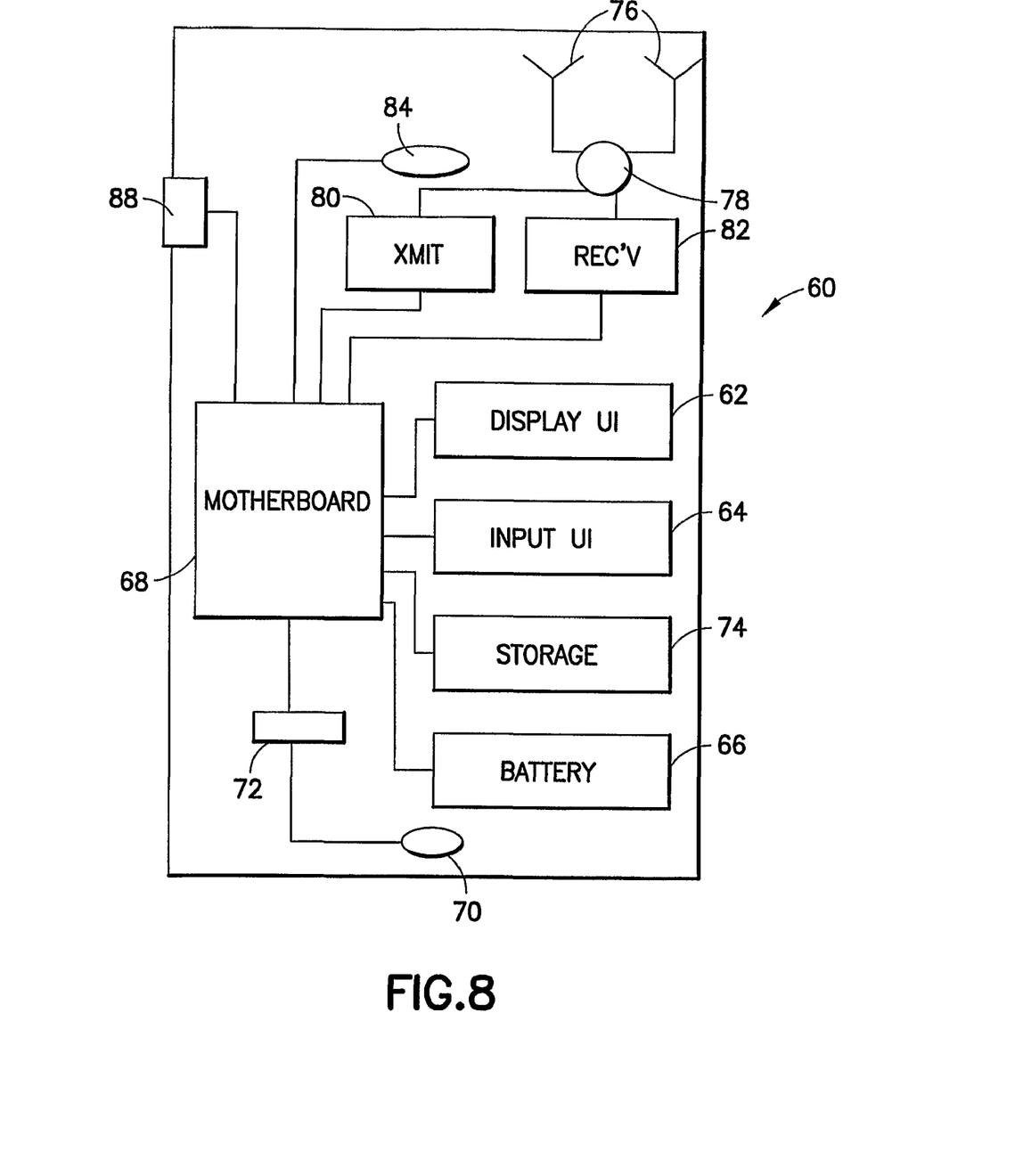
FIG. 8 is a schematic block diagram of a mobile station in which the embodiment of FIG. 2 may be disposed.

FIG. 8 is a block diagram of an exemplary mobile station 60 in which the present invention may be disposed. These blocks are functional and the functions described below may or may not be performed by a single physical entity as described with reference to FIG. 8. A display user interface 62, such as a circuit board for driving a visual display screen, and an input user interface 64, such as a unit for receiving inputs from an array of user actuated buttons, are provided for interfacing with a user. The user may select between the traditional silent alert mode at the input user interface 64, so that the vibration mechanism is actuated, silently, upon receipt of a page or incoming call. The MS 60 further includes a power source 66 such as a self-contained battery that provides electrical power to a motherboard 68 that controls functions within the MS 60. The motherboard represents one or more circuit boards on which a general processor and/or a digital signal processor are disposed, as well as the diodes, amplifiers, and mappers described with reference to FIGS. 2-3. Within the processor (general or DSP) of the motherboard 68 are functions such as digital sampling, decimation, interpolation, encoding and decoding, modulating and demodulating, encrypting and decrypting, spreading and despreading (for a CDMA compatible MS 60), and additional signal processing functions known in the art.

Voice or other aural inputs are received at a microphone 70 that may be coupled to the processor of the motherboard 68 through a buffer memory 72. Computer programs such as drivers for the display 62, algorithms to modulate, encode and decode, data arrays such as look-up tables, and the like are stored in a main memory storage media 74 which may be an electronic, optical, or magnetic memory storage media as is known in the art for storing computer readable instructions and programs and data. The main memory 74 is typically partitioned into volatile and non-volatile portions, and is commonly dispersed among different storage units, some of which may be removable. The memory 74 may also store music or other audio files that may serve as an audio signal source for the invention as detailed above. The MS 60 communicates over a network link such as a mobile telephony link via one or more antennas 76 that may be selectively coupled via a T/R switch 78 or diplex filter, to a transmitter 80 and a receiver 82. The MS 60 may additionally have secondary transmitters and receivers for communicating over additional networks, such as a WLAN, WIFI, Bluetooth®, or to receive digital video broadcasts. Any of these links may serve as a source for the said audio signal processed by the present invention. Known antenna types include monopole, di-pole, planar inverted folded antenna PIFA, and others. The various antennas may be mounted primarily externally (e.g., whip) or completely internally of the MS 20 housing. Audible output from the MS 60 is transduced at a speaker 84 and at a vibration mechanism 88, as detailed above.

While described above as incorporated within a mobile station, the invention is not so limited. For example, the invention may be embodied as a portable electronic device that is physically separated from a mobile station, radio, MP3 player, or other external source device. That external source device need not be portable itself. The portable electronic device of such an embodiment has disposed in it the vibration motor for vibrating its own housing, and a plug-in input port and/or an antenna/receiver arrangement as the source for receiving an electronic signal from the external source device. A wired connection between the portable electronic device and the external source device couples at the input port. A wireless connection, such as over a Bluetooth or other personal area network, a low power FM band (or other broadcast radio), or other wireless protocol is established with the antenna/receiver, which serves as the source of the signal in this embodiment.

Various modifications and adaptations may become apparent to those skilled in the relevant arts in view of the foregoing description, when read in conjunction with the accompanying drawings. As but some examples, the use of other similar or equivalent components or combinations of components may be attempted by those skilled in the art. However, all such and similar modifications of the teachings of this invention will still fall within the scope of the non-limiting embodiments of this invention. Furthermore, some of the features of the various non-limiting embodiments of this invention may be used to advantage without the corresponding use of other features. For example, advantages of the present invention may be gained without employing the tweeter to transduce high frequency audio components. As such, the foregoing description should be considered as merely illustrative of the principles, teachings and exemplary embodiments of this invention, and not in limitation thereof.

What is claimed is:

1. A method of transducing an audio signal in a portable electronic device comprising:
    generating a series of driving pulses by pulse-width modulating an electronic audio signal; and
    adaptively driving a vibration motor with at least some of the series of driving pulses to transduce the electronic audio signal into a vibration, such that each driving pulse corresponds to an instant where an amplitude of the electronic audio signal positively crosses a first adaptive threshold level, where the vibration motor is configured to vibrate a housing of the portable electronic device.

2. The method of claim 1, wherein generating a series of driving pulses comprises, for each of the series of driving pulses that drive the vibration motor:
    rectifying a sample of the electronic audio signal;
    determining an amplitude of the rectified sample; and
    mapping the amplitude to a pulse width.

3. The method of claim 1, wherein pulse width modulation is constrained to less than about 50 milliseconds.

4. The method of claim 1, wherein the vibration motor is configured to vibrate the housing by rotating an imbalanced rotor.

5. The method of claim 1, wherein the electronic audio signal comprises one of a digital audio file stored in a local memory of the device, a signal received over a wireless link in real time by a receiver of the device, and a signal received via a conductive wire coupled to an input port of the device.

6. The method of claim 1, wherein adaptively driving the vibration motor comprises imposing a time delay, following each driving pulse that uniquely corresponds to the instant, during which no other driving pulses drive the vibration motor.

7. The method of claim 1, wherein adaptively driving the vibration motor comprises imposing a constraint, following each driving pulse that uniquely corresponds to the instant, during which no other driving pulses drive the vibration motor, the constraint comprising an amplitude of the electronic audio signal falling below a second adaptive threshold level, wherein the first and second adaptive threshold levels may be the same level.

8. The method of claim 1 further comprising low pass filtering the electronic audio signal prior to generating a series of driving pulses;
    and where driving a vibration motor with the series of driving pulses comprises driving the motor with a series of amplified driving pulses.

9. A portable electronic device comprising:
    a housing;

a vibration motor coupled to the housing for imparting vibration thereto;

a source for providing an electronic signal;

a mapper, having an input coupled to an output of the source, for converting a pulse amplitude to a corresponding pulse width; and an amplifier disposed between the mapper and the vibration motor for amplifying a signal from the mapper and driving the vibration motor with the amplified signal to produce a vibration.

10. The portable electronic device of claim 9, wherein the mapper comprises a pulse-width modulator and the electronic signal comprises an audio signal.

11. The portable device of claim 9, wherein the mapper comprises, in series, a rectifier diode having an output coupled to an input of a voltage quantifier, a processor having an input coupled to an output of the voltage quantifier, and an amplifier having an input coupled to an output of the processor.

12. The portable device of claim 9 wherein the mapper operates to constrain pulse width to less than about 50 milliseconds.

13. The portable device of claim 9 comprising a mobile station.

14. The portable device of claim 9 further comprising a low pass filter disposed between the mapper and the source.

15. The portable device of claim 14, further comprising, in parallel with the low pass filter, mapper, amplifier, and vibration motor, a speaker in series with a second amplifier of different gain from the first amplifier, said second amplifier disposed between the source and the speaker.

16. The portable device of claim 15, further comprising a high pass filter disposed between the second amplifier and the source, and wherein the said speaker is a first speaker and said low pass filter is a first low pass filter;

the device further comprising, in parallel with the high pass filter and the first speaker, a second low pass filter in series with a third amplifier and a second speaker.

17. The portable device of claim 15, further comprising a delay buffer disposed between the speaker and the source, said delay buffer in parallel with the vibration motor.

18. The portable device of claim 9 wherein the source comprises an antenna for receiving the electronic signal over a wireless link in real time.

19. The portable device of claim 9, wherein the source comprises an input port for coupling to a separate music device via a conductive wire.

20. The portable device of claim 9, further comprising, between the source and the mapper, at least one of an automatic gain control block applying an amplitude sensitive gain control, and a compression block for applying an amplitude sensitive compression algorithm.

21. A mobile station comprising:

means for providing an electronic audio signal;

means for modulating at least some pulse amplitudes of the electronic audio signal to corresponding pulse widths, wherein the means for modulating comprises a rectifier diode, a voltage quantifier, and a processor for mapping quantified voltage to pulse width;

means for driving a motor means with the corresponding pulse widths, wherein the means for driving the motor means comprises an amplifier; and motor means for transducing the pulse widths into vibrations, wherein the motor means comprises a vibration motor coupled to a housing of the mobile station, said vibration motor having an imbalanced rotor.

* * * * *